United States Patent
Chang et al.

(10) Patent No.: US 8,811,043 B2
(45) Date of Patent: Aug. 19, 2014

(54) SWITCHING REGULATOR CAPABLE OF SUPPRESSING INRUSH CURRENT AND CONTROL CIRCUIT THEREOF

(75) Inventors: Kuang-Fu Chang, Kaohsiung (TW); Yu-Chang Chen, Jiji Township, Nantou County (TW)

(73) Assignee: Richtek Technology Corporation, Hsin-Chu (TW)

(*) Notice: Subject to any disclaimer, the term of this patent is extended or adjusted under 35 U.S.C. 154(b) by 144 days.

(21) Appl. No.: 13/544,542

(22) Filed: Jul. 9, 2012

(65) Prior Publication Data

US 2012/0274299 A1    Nov. 1, 2012

(30) Foreign Application Priority Data

Aug. 11, 2011  (TW) .............................. 100214928 U

(51) Int. Cl.
*H02M 3/335* (2006.01)

(52) U.S. Cl.
USPC ................. 363/21.12; 363/21.14; 363/21.15; 363/21.16; 363/21.17; 363/21.18

(58) Field of Classification Search
USPC .......... 363/21.12, 21.14, 21.15, 21.16, 21.17, 363/21.18
See application file for complete search history.

(56) References Cited

U.S. PATENT DOCUMENTS

| | | | |
|---|---|---|---|
| 8,044,644 B2* | 10/2011 | Huang et al. .................. | 323/271 |
| 8,520,346 B2* | 8/2013 | Ando .............................. | 361/23 |
| 8,611,106 B2* | 12/2013 | Fang .......................... | 363/21.01 |
| 2007/0279820 A1* | 12/2007 | Fang et al. ...................... | 361/97 |
| 2012/0039007 A1* | 2/2012 | Turchi et al. .................... | 361/87 |

* cited by examiner

*Primary Examiner* — Bao Q Vu
(74) *Attorney, Agent, or Firm* — Tung & Associates

(57) ABSTRACT

The present invention discloses a switching regulator, including: a power stage including at least one power transistor which switches according to a switch control signal to convert an input voltage to an output voltage; a pulse width modulation (PWM) signal generator generating a PWM signal according to the output voltage; an over current detection circuit comparing a current sensing signal with a reference signal to generate an over current signal indicating whether an over current is occurring; and a signal adjustment circuit adjusting the PWM signal or a clock signal to generate the switch control signal for controlling an ON time of the power transistor of the power stage.

6 Claims, 5 Drawing Sheets

US 8,811,043 B2

SWITCHING REGULATOR CAPABLE OF SUPPRESSING INRUSH CURRENT AND CONTROL CIRCUIT THEREOF

CROSS REFERENCE

The present invention claims priority to TW 100214928, filed on Aug. 11, 2011.

BACKGROUND OF THE INVENTION

Field of Invention

The present invention relates to a switching regulator and a control circuit of a switching regulator, in particular to such switching regulator and control circuit that can avoid the occurrence of a large inrush current during the beginning of power start.

A flyback regulator is an isolation type regulator using a transformer to covert an input voltage to an output voltage. The energy is stored and transformed through charging and discharging of the windings of the transformer. FIG. 1 shows a schematic diagram of a prior art AC-DC flyback regulator. The switching regulator 10 basically comprises a voltage conversion circuit 14 and a control circuit 15. The voltage conversion circuit 14 converts the input voltage Vin at the primary side of a transformer 11 to the output voltage Vout at the secondary side of the transformer 11. The control circuit 15 detects current and receives a feedback signal COMP to drive the voltage conversion circuit 14 for voltage conversion. The transformer 11 includes a primary winding and a secondary winding; the circuit connected to the primary winding is referred to as a primary side circuit, and the circuit connected to the secondary winding is referred to as a secondary side circuit. The secondary side circuit transmit signals to the primary side circuit through an opto-coupler 12, for sending the feedback signal COMP to the control circuit 15. The control circuit 15 generates a switch control signal Vgate to control a power transistor 13, and the control circuit 15 detects the input current Iin flowing through the power transistor 13 by obtaining a voltage across a resistor Rcs connected in series with the power transistor 13; the voltage across the resistor Rcs is the primary side current sensing signal Vcs.

In the start-up stage of the regulator 10, because the output voltage Vout is far lower than the target voltage, the feedback control mechanism will cause the power transistor 13 to operate under a maximum duty. This will incur a large inrush current at the primary side circuit, bringing a high risk of damaging the power transistor 13 and other components. The voltage Vcs at the node A will keep increasing due to the inrush current, which can be explained by the following formulas (1) and (2) and further in view of FIG. 2.:

$$\Delta Iin \propto \frac{Vin}{Lp} \quad (1)$$

$$\Delta Iout \propto \frac{Vout}{Ls} \propto n^2 \cdot \frac{Vout}{Lp} \quad (2)$$

Wherein ΔIin is the variation in the input current; Lp is the inductance of the primary winding; ΔIout is the variation of the output current; Ls is the inductance of the secondary winding; Vout is the output voltage; n is the ratio of the turn number of the primary side to that of the secondary side of the transformer. Comparing formula (1) with formula (2), we can observe that ΔIin is larger than ΔIout during the start-up stage because the output voltage Vout is very low but the input Vin has already been provided at a normal level. Therefore, the voltage Vcs will gradually increase. The corresponding waveform is shown in FIG. 2.

FIG. 2 is a waveform diagram showing waveforms of the voltage Vcs at the node A and the switch control signal Vgate in FIG. 1. When the regulator 10 just starts-up, the switch control signal Vgate of the control circuit 15 periodically and continuously turns ON the power transistor 13. The output voltage Vout is yet to be established and still at a low level, so the voltage Vcs keeps increasing because the input current Iin is increasing. In the figure, the increment Δ1 of the voltage Vcs is in direct proportion to the increment ΔIin of the current variation of formula (1), that is, Δ1∝ΔIin. The decrement Δ2 of the voltage Vcs is in direct proportion to the variation ΔIout of the input current in formula (2), that is, Δ2∝ΔIout. Each time the power transistor 13 is turned ON, the voltage Vcs is increased even more, because Δ1>Δ2, as shown in FIG. 2.

In order to suppress the impact by the inrush current, a typical solution is to provide a soft start circuit in the regulator. The conventional soft start circuit increases the start-up duration, so that power increases softly. However, such soft start circuit cannot effectively suppress the inrush current; it is found that the input current Iin and the voltage Vcs are still too large and there is high risk of damaging the current detection resistor and the power transistor of the regulator due to the over current.

In view of above, the present invention overcomes the foregoing drawbacks by providing a switching regulator and a control circuit that avoid the occurrence of a large inrush current during the beginning of the power start. The problems of damaging the current detection resistor, the power transistor and other components due to the over current can be solved, without requiring a circuit occupying a large area.

SUMMARY OF THE INVENTION

An objective of the present invention is to provide a switching regulator.

Another objective of the present invention is to provide a control circuit of a switching regulator.

To achieve the foregoing objectives, in one aspect, the present invention provides a switching regulator which comprises: a power stage including at least one power transistor which switches according to a switch control signal to convert an input voltage to an output voltage; a pulse width modulation (PWM) signal generator generating a PWM signal according to the output voltage; an over current detection circuit comparing a current sensing signal with a reference signal to generate an over current signal indicating whether an over current is occurring; and a signal adjustment circuit adjusting the PWM signal or a clock signal according to the over current signal to generate the switch control signal for controlling an ON time of the power transistor of the power stage.

In one embodiment, the over current detection circuit includes a comparator for comparing the current sensing signal with the reference signal.

In one embodiment, the signal adjustment circuit includes a logic gate which receives the over current signal and one of the PWM signal and the clock signal to generate the switch control signal.

In another embodiment, the signal adjustment circuit includes: a counter coupled to the over current detection circuit and operating according to the clock signal, the counter counting a number of occurrences of the over current signal indicating occurring of the over current and changing its output level when the number of occurrences reaches a predetermined count setting value; a flip flop coupled to the over current detection circuit and the counter, the flip flop generating a first output when the over current signal indicates that the over current is not occurring, the flip flop generating a second output when the over current signal indicates occurring of the over current, and the flip flop returning to the first output when a count of the counter reaches the predetermined count setting value; and a logic gate receiving an output of the flip flop and one of the PWM signal and the clock signal to generate the switch control signal.

The foregoing switching regulator is an AC-DC switching regulator or a DC-DC switching regulator.

In another embodiment, the present invention provides a control circuit of a switching regulator. The switching regulator includes at least one power transistor which switches to convert an input voltage to an output voltage. The control circuit controls the power transistor according to a current sensing signal. The control circuit comprising: an over current detection circuit comparing a current sensing signal with a reference signal to generate an over current signal indicating whether an over current is occurring; and a signal adjustment circuit adjusting the PWM signal or a clock signal according to the over current signal to generate a switch control signal for controlling an ON time of the power transistor of the power stage.

The objectives, technical details, features, and effects of the present invention will be better understood with regard to the detailed description of the embodiments below, with reference to the drawings.

DESCRIPTION OF THE PREFERRED EMBODIMENT

Figure 3:
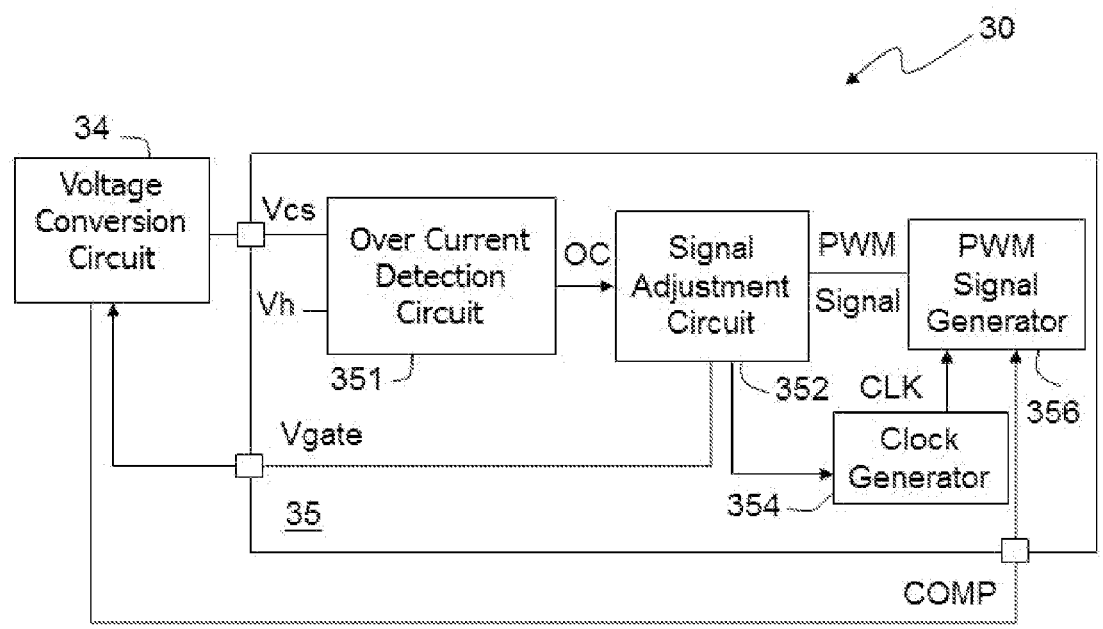
FIG. 3 shows an embodiment of a switching regulator according to the present invention.

FIG. 3 shows an embodiment of a switching regulator according to the present invention. The switching regulator can be any type of AC-DC or DC-DC switching regulator, and is not limited to the AC-DC switching regulator shown in FIG. 1. In either the AC-DC or the DC-DC switching regulator, it is customary to generate current sensing signals. As shown in this figure, the current sensing signal Vcs generated by the voltage conversion circuit 34 of a switching regulator 30 is inputted to the over current detection circuit 351 of the control circuit 35. The over current detection circuit 351 compares the current sensing signal Vcs with a reference signal Vh to generate an over current signal OC if Vcs is higher than Vh. The signal adjustment circuit 352 adjusts, according to the over current signal OC, a PWM signal or a clock signal CLK (one or both of these signals can be adjusted) generated from the clock generator 354, to generate a switch control signal Vgate. The switch control signal Vgate controls an ON time (the ON and OFF timings, pulse width or frequency) of the power transistor (not shown in this figure, referring to FIG. 1 and FIGS. 6A-10B) in a power stage of the voltage conversion circuit 34. The PWM signal generator 356 generates the foregoing PWM signal according to the feedback signal COMP from the voltage conversion circuit 34. To suppress the inrush current such that the current sensing signal Vcs does not keep increasing, for example, the switch control signal Vgate can temporarily reduce the turned-on times or the turned-on frequency of the power transistor.

Figure 4:
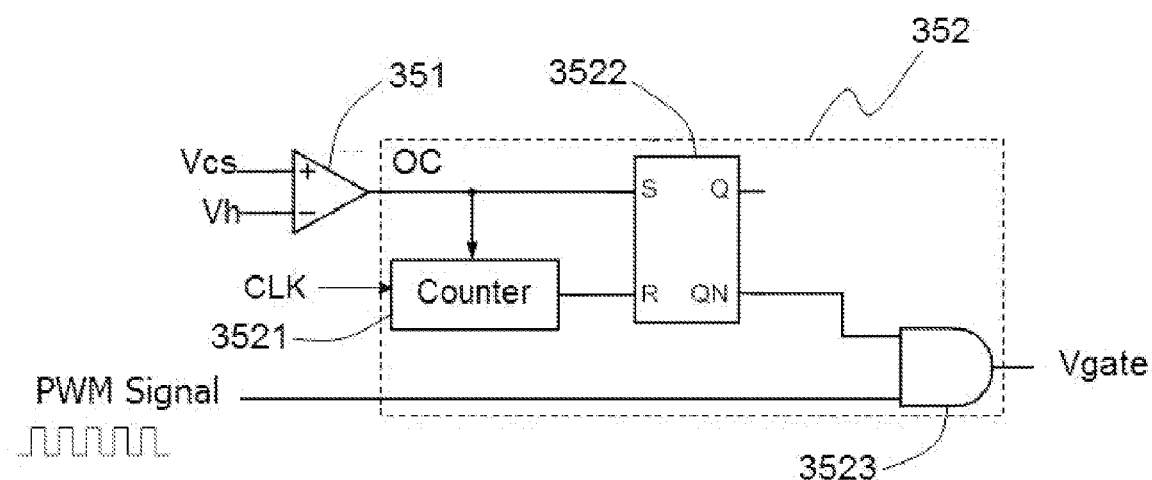
FIG. 4 shows an embodiment of the over current detection circuit and the signal adjustment circuit of a control circuit according to the present invention, illustrating.

FIG. 4 shows an embodiment of the over current detection circuit and the signal adjustment circuit of a control circuit according to the present invention. In this embodiment, the over current detection circuit 351 is a comparator. The signal adjustment circuit 352 includes a counter 3521, an SR flip flop 3522 and a logic gate 3523. When the current sensing signal Vcs is lower than the reference signal Vh, this means no over current and the over current signal OC is at low level. Thus, the setting input S of the SR flip flop 3522 is zero, and the counter 3521 has no count yet, so R=1 (initial value), Q=0, and QN=1. When QN is 1, the switch control signal Vgate is determined by the PWM signal. That is, if the PWM signal is at high level, the logic gate 3523 (such as an AND gate in the embodiment) outputs the switch control signal Vgate at high level. If the PWM signal is at low level, the AND gage 3523 outputs the switch control signal Vgate at low level, as shown in FIG. 5.

Figure 2:
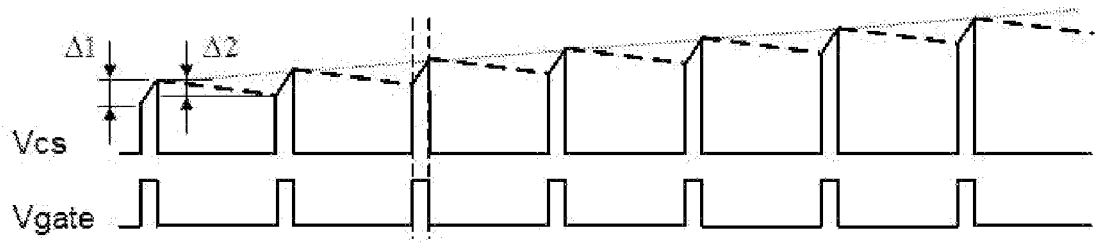
FIG. 2 shows the waveform diagram of the voltage Vcs at the node A and the switch control signal Vgate in FIG. 1.
Figure 5:
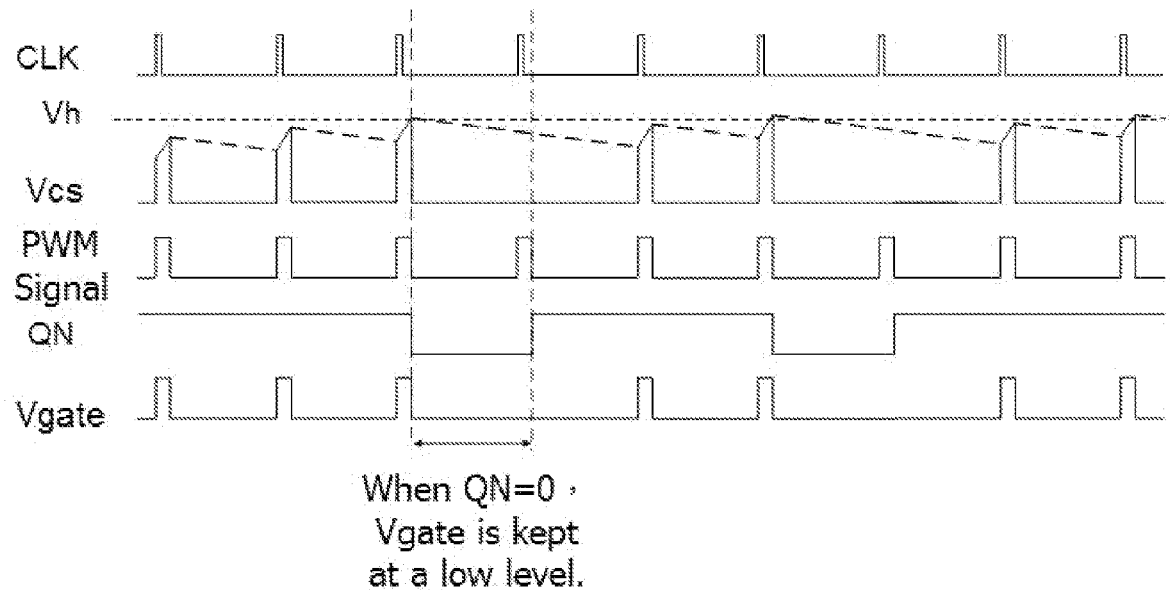
FIG. 5 is a waveform diagram showing signal waveforms of a regulator according to the present invention.
Figures 6A, 6B:
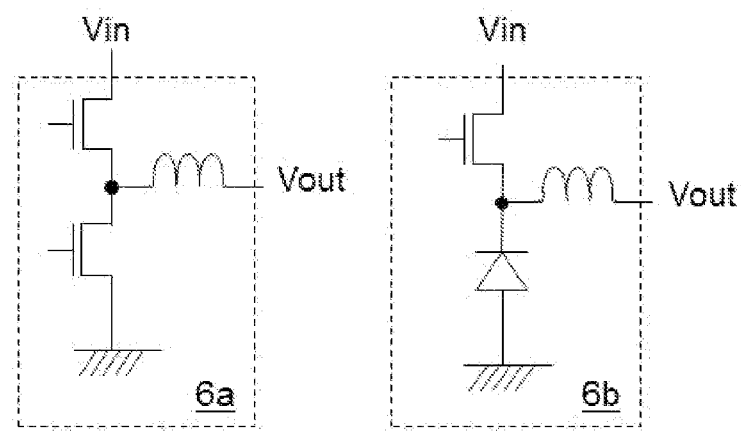
FIGS. 6A and 6B show schematic circuit diagrams of buck converters.
Figure 7A:
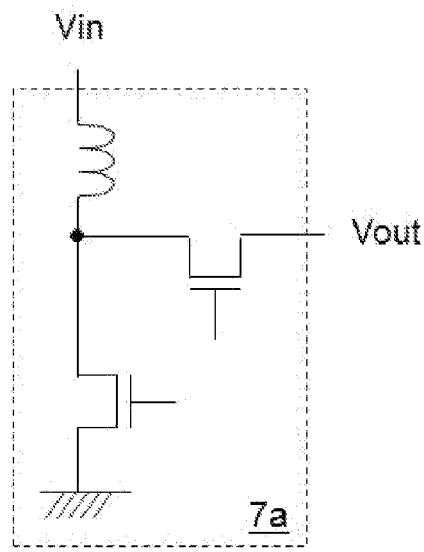
FIGS. 7A and 7B show schematic circuit diagrams of boost converters.
Figure 7B:
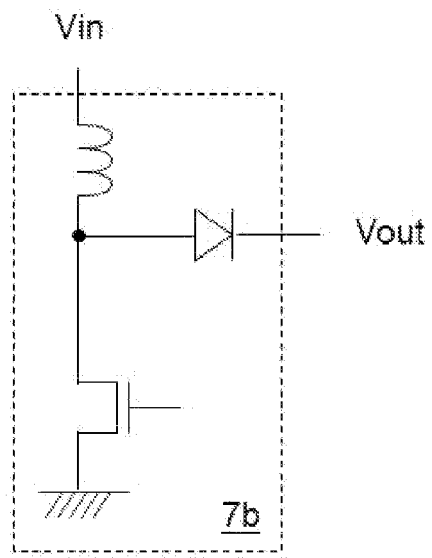
Figure 8A:
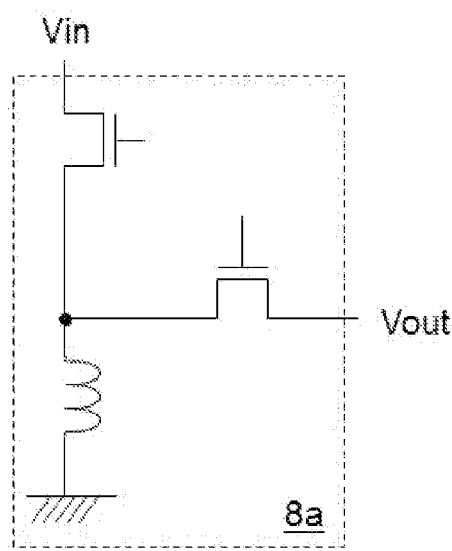
FIGS. 8A and 8B show schematic circuit diagrams of inverting converters.
Figure 8B:
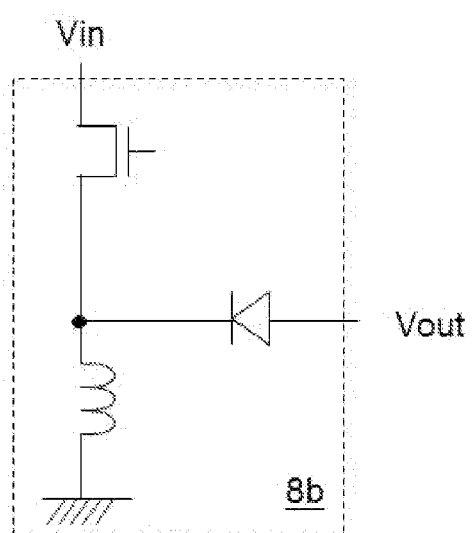
Figure 9A:
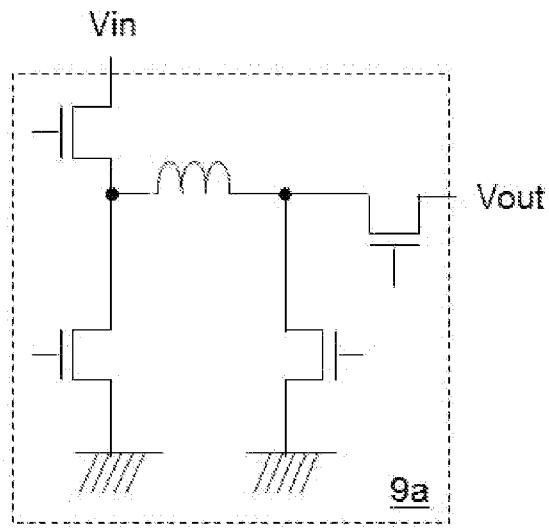
FIGS. 9A and 9B show schematic circuit diagrams of buck-boost converters.
Figure 9B:
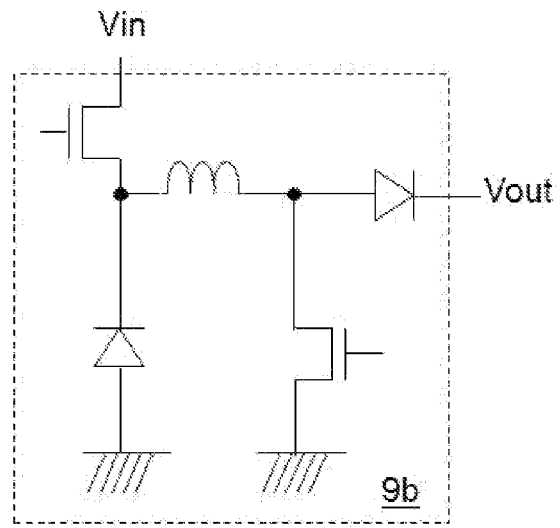
Figure 10A:
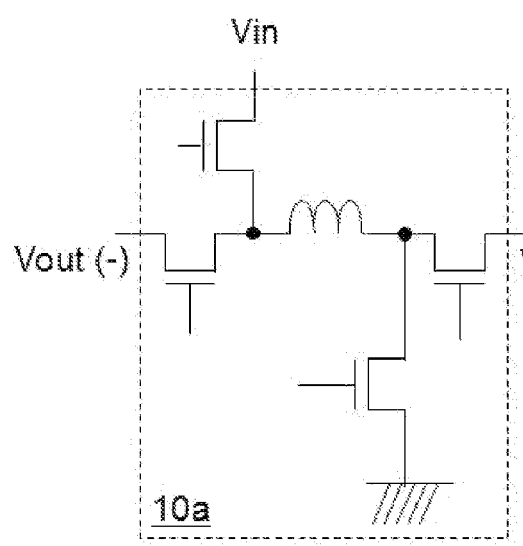
FIGS. 10A and 10B show schematic circuit diagrams of inverter-boost converters.
Figure 10B:
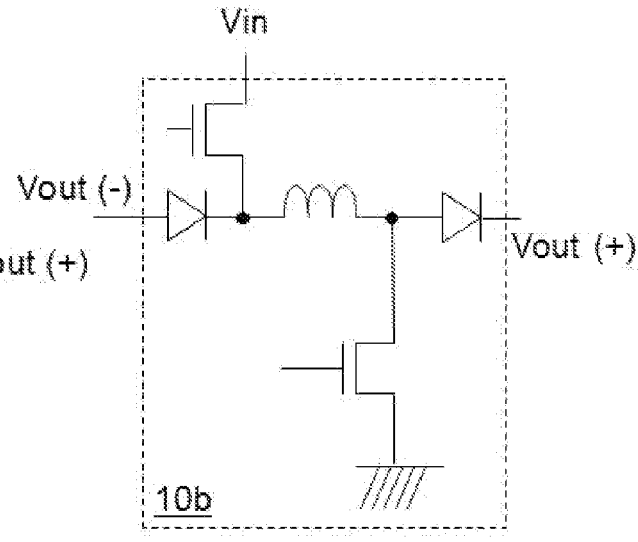

Referring to FIGS. 4 and 5 and the previous description with respect to FIG. 2, if the switch control signal Vgate turns ON the power transistor during each cycle of the clock signal CLK, the current sensing signal Vcs will keep rising. When the current sensing signal Vcs is higher than the reference signal Vh, this means the occurring of the over current, and the over current signal OC changes to high level. Thus, the setting input S of the SR flip flop 3522 is 1, so the inverse output QN of the SR flip flop 3522 is zero and the switch control signal Vgate outputted by the AND gate 3523 is at low level and no longer determined by the PWM signal. Moreover, the counter 3521 starts to count, and its output keeps at 0 if the count of the counter 3521 has not reached the count setting value. When the count reaches the count setting value, the output of the counter 3521 switches to high level and the SR flip flop 3522 is reset, so R=1, Q=0, and QN=1. Thus, the switch control signal Vgate returns to be determined by the PWM signal. When the switch control signal Vgate keeps at low level, the power transistor of the voltage conversion circuit 34 will not be turned on. As shown in FIG. 5, the current sensing signal Vcs is suppressed and it does not rise any more. The count setting value for the counter 3521 to output high and the reference signal Vh determining the occurring of the over current can be set by a designer according to the requirements and specification of the power regulator 30. The count setting value is set to 1 in the embodiment of FIG. 5, so the switch control signal Vgate keeps at low level for only one cycle. For the same purpose (to keep the switch control signal Vgate at low level for one cycle), an alternative way is to reduce the frequency of the clock signal. That is, if the frequency of the clock signal is reduced to half of the original frequency, it is equivalent to keeping the switch control signal Vgate keeps at low level for one cycle. If the frequency of the clock signal is reduced to one third of the original frequency, it is equivalent to keeping the switch control signal Vgate keeps at low level for two cycles.

Figure 1:
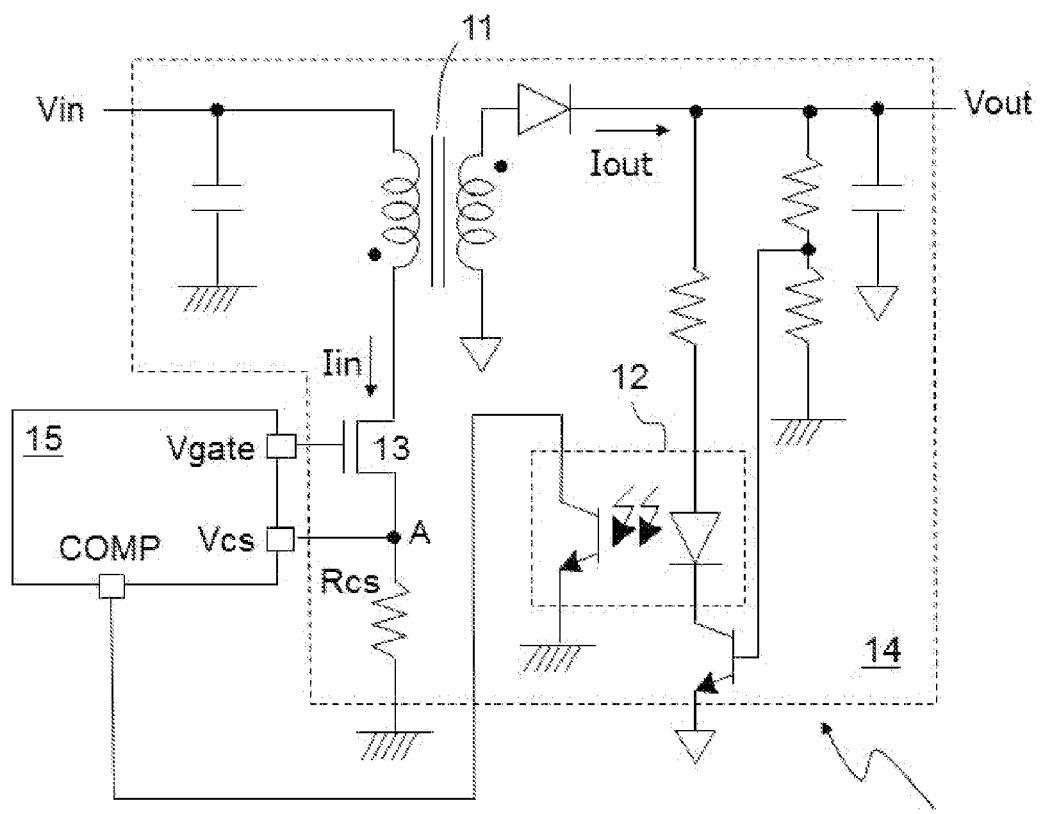
FIG. 1 shows a schematic diagram of a prior art AC-DC switching regulator.

In the foregoing embodiments, the switching regulator 30 is not limited to an AC-DC converter; it can be a DC-DC converter. For example, if the switching regulator 30 is an AC-DC converter, it may be the prior art switching regulator 10 as shown in FIG. 1 (with a different controller). If the switching regulator 30 is a DC-DC converter, the DC-DC converter may be a buck converter (6a, 6b) shown in FIG. 6A or 6B, boost converter (7a, 7b) shown in FIG. 7A or 7B, inverting converter (8a, 8b) shown in FIG. 8A or 8B, buck-boost converter (9a, 9b) shown in FIG. 9A or 9B, or inverter-boost converter (10a, 10b) shown in FIGS. 10A and 10B.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the flip flop is not limited to the SR flip flop 3521, and may be other types of flip flops. Moreover, the meanings of the high level and low level of a digital signal are interchangeable, and the circuit can be correspondingly modified. In this regard, the positive and negative terminals of the comparators 351 are interchangeable, and the gate 3523 may be replaced by other proper logic gates and so on. Thus, the present invention should cover all such and other modifications and variations, which should be interpreted to fall within the scope of the following claims and their equivalents.

What is claimed is:

1. A switching regulator, comprising:
   a power stage including at least one power transistor which switches according to a switch control signal to convert an input voltage to an output voltage;
   a pulse width modulation (PWM) signal generator generating a PWM signal according to the output voltage;
   an over current detection circuit comparing a current sensing signal with a reference signal to generate an over current signal indicating whether an over current is occurring; and
   a signal adjustment circuit adjusting the PWM signal or a clock signal according to the over current signal to generate the switch control signal for controlling an ON time of the power transistor of the power stage,
   wherein the signal adjustment circuit includes:
      a counter coupled to the over current detection circuit and operating according to the clock signal, the counter counting a number of occurrences of the over current signal indicating occurring of the over current and changing its output level when the number of occurrences reaches a predetermined count setting value;
      a flip flop coupled to the over current detection circuit and the counter, the flip flop generating a first output when the over current signal indicates that the over current is not occurring, the flip flop generating a second output when the over current signal indicates occurring of the over current, and the flip flop returning to the first output when a count of the counter reaches the predetermined count setting value; and
      a logic gate receiving an output of the flip flop and one of the PWM signal and the clock signal to generate the switch control signal.

2. The switching regulator of claim 1, wherein the over current detection circuit includes a comparator for comparing the current sensing signal with the reference signal.

3. The switching regulator of claim 1, wherein the switching regulator is an AC-DC switching regulator or a DC-DC switching regulator.

4. A control circuit of a switching regulator including at least one power transistor which switches to convert an input voltage to an output voltage, the control circuit controlling the power transistor according to a current sensing signal, the control circuit comprising:
   an over current detection circuit comparing a current sensing signal with a reference signal to generate an over current signal indicating whether an over current is occurring; and
   a signal adjustment circuit adjusting the PWM signal or a clock signal according to the over current signal to generate a switch control signal for controlling an ON time of the power transistor of the power stage,
   wherein the signal adjustment circuit includes:
      a counter coupled to the over current detection current and operating according to the clock signal, the counter counting a number of occurrences of the over current signal indicating occurring of the over current and changing its output level when the number of occurrences reaches a predetermined count setting value;
      a flip flop coupled to the over current detection circuit and the counter, the flip flop generating a first output when the over current signal indicates that the over current is not occurring, the flip flop generating a second output when the over current signal indicates occurring of the over current, and the flip flop returning to the first output when a count of the counter reaches the predetermined count setting value; and
      a logic gate receiving an output of the flip flop and one of the PWM signal and the clock signal to generate the switch control signal.

5. The switching regulator of claim 4, wherein the over current detection circuit includes a comparator for comparing the current sensing signal with the reference signal.

6. The switching regulator of claim 4, further comprising a pulse width modulation (PWM) signal generator generating a PWM signal according to the output voltage.

\* \* \* \* \*